United States Patent [19]

Gooch

[11] 4,115,827
[45] Sep. 19, 1978

[54] MAGNETIC TRANSDUCER FOR NARROW TRACK RECORDING AND PLAYBACK

[75] Inventor: Beverley R. Gooch, Sunnyvale, Calif.

[73] Assignee: Ampex Corporation, Redwood City, Calif.

[21] Appl. No.: 615,532

[22] Filed: Sep. 22, 1975

[51] Int. Cl.² .......................... G11B 5/14; G11B 5/22; G11B 5/28
[52] U.S. Cl. ...................................... 360/121; 29/603; 360/122; 360/125
[58] Field of Search ............... 360/121, 125, 122, 126, 360/127, 123; 29/603

[56] References Cited

U.S. PATENT DOCUMENTS

| 3,187,410 | 6/1965 | Duinker et al. | 360/125 |
| 3,303,292 | 2/1967 | Bedell, Jr. et al. | 360/125 |
| 3,354,540 | 11/1967 | Duinker | 29/603 |
| 3,495,325 | 2/1970 | Bos et al. | 360/121 |
| 3,597,836 | 8/1971 | Osaka | 29/603 |
| 3,845,550 | 11/1974 | Gooch et al. | 29/603 |
| 3,846,840 | 11/1974 | Childers et al. | 360/121 |

FOREIGN PATENT DOCUMENTS 1,128,646   9/1968   United Kingdom ..................... 360/125

OTHER PUBLICATIONS

IBM Tech. Disc. Bull., Nystrom et al., Fabrication of Ferrite Recording Heads, vol. 12, No. 7, Nov. 1969, pp. 965-966.

Primary Examiner—Alfred H. Eddleman

[57] ABSTRACT

A transducer core having a magnetic core defining a non-magnetic gap and being integrally joined with a superposed composite body. The composite body has a nonmagnetic front portion spanning the nonmagnetic gap and a contiguous magnetic back portion. The superposed core and body are provided with overlapping grooves forming a window adapted to receive transducer windings.

A method of manufacturing a magnetic transducer is provided wherein two complementary blocks of magnetic material are bonded together to define a nonmagnetic gap therebetween. A confronting surface of one of the blocks is grooved prior to bonding. The resulting magnetic block is sliced into a plurality of magnetic cores. A second magnetic block is provided with a longitudinal groove along one side thereof which side is bonded to a nonmagnetic block. The resulting composite block is sliced into a plurality of composite bodies, each comprising a nonmagnetic front portion and a magnetic back portion. Each magnetic core is superposed with a composite body and bonded thereto with the nonmagnetic gap spanned by the nonmagnetic front portion and with the respective grooves overlapping. The exposed planar surface of the superposed magnetic core is lapped until its width is reduced to a desired track width.

20 Claims, 15 Drawing Figures

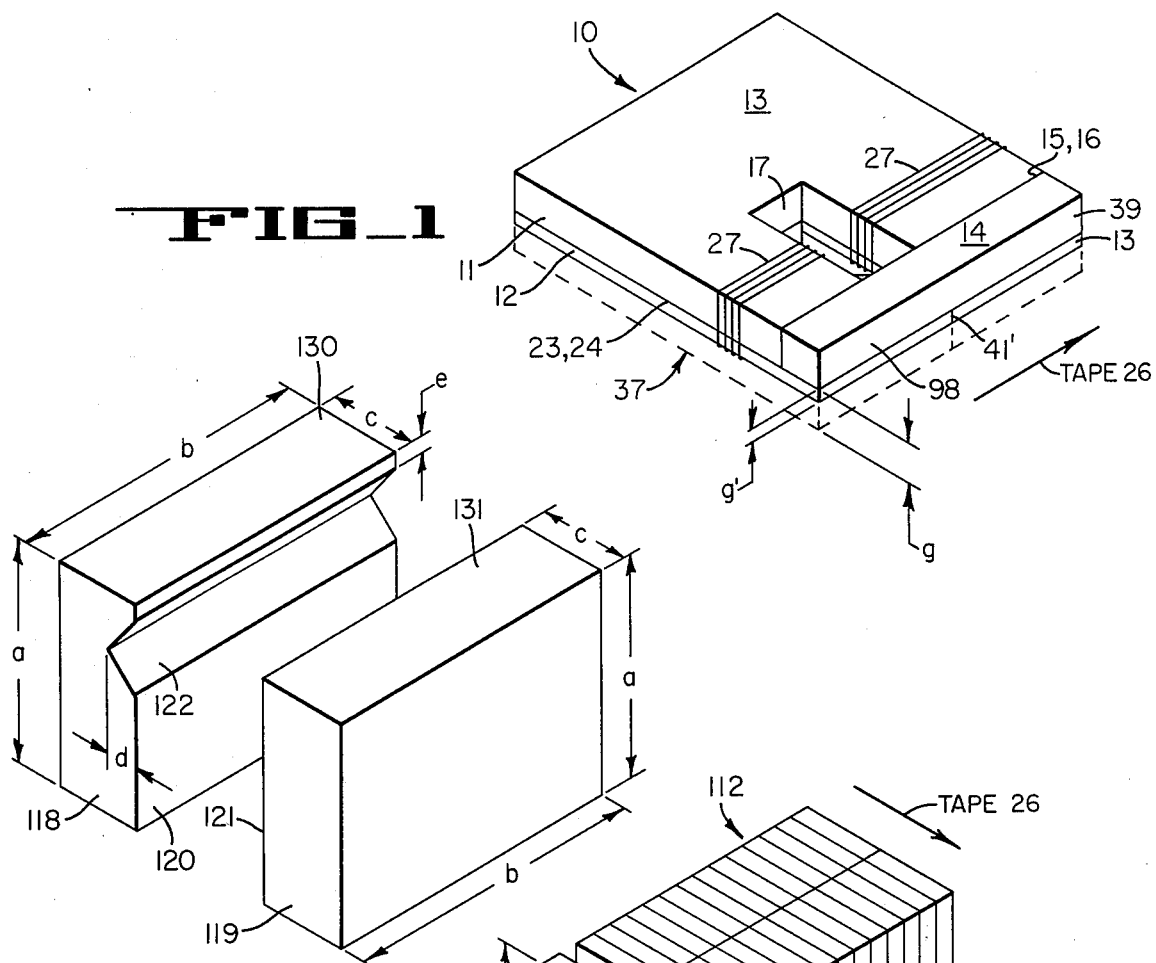
FIG_1
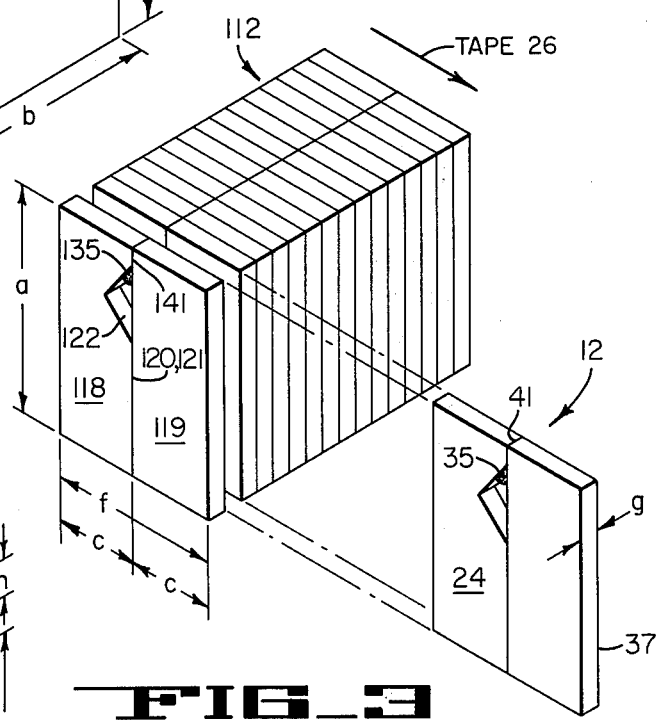
FIG_2
FIG_3
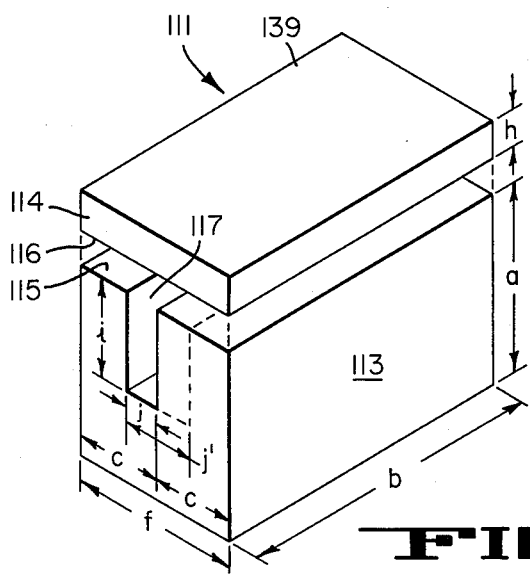
FIG_4

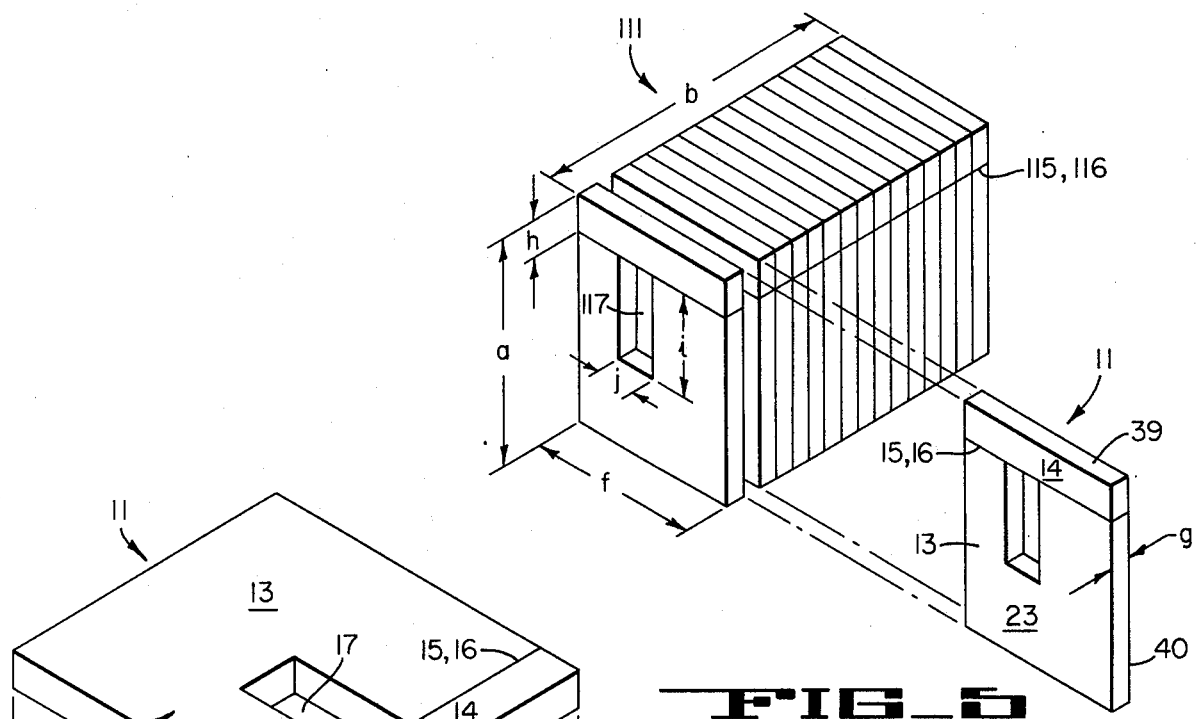
FIG_5
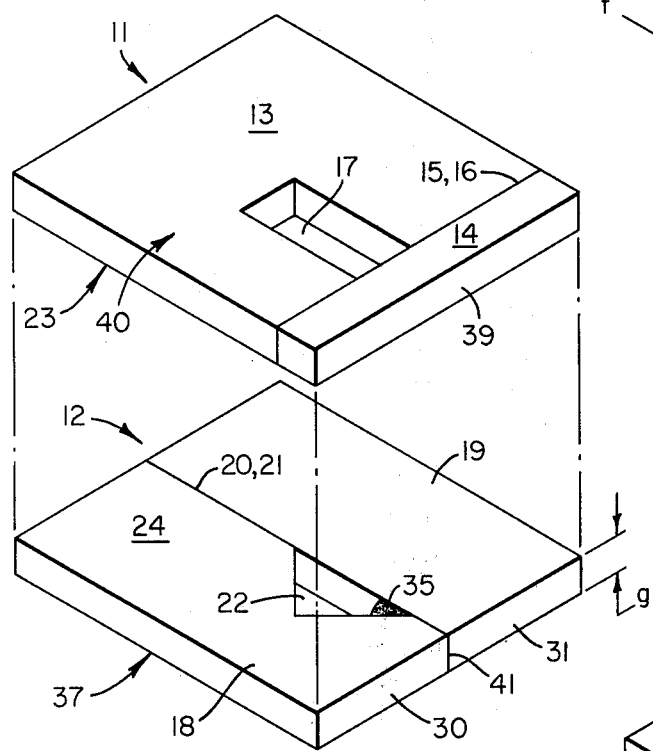
FIG_6
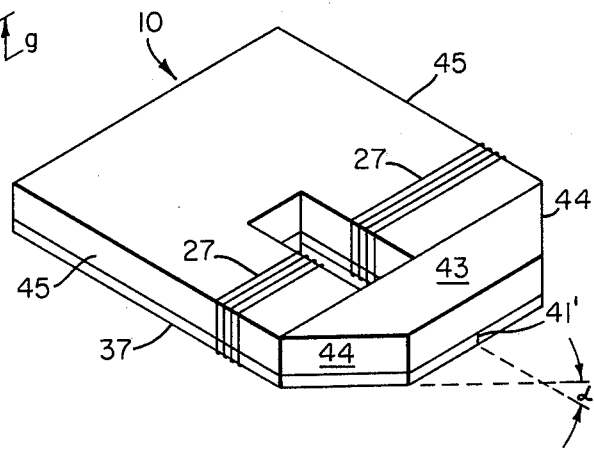
FIG_7
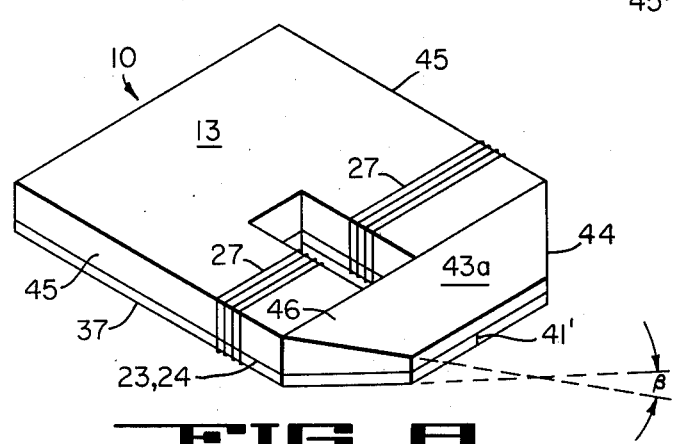
FIG_8

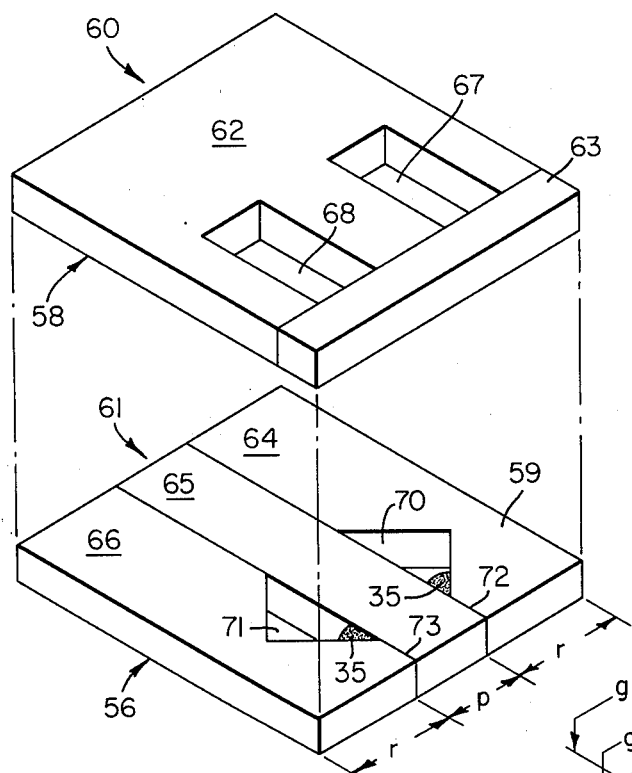
FIG_12
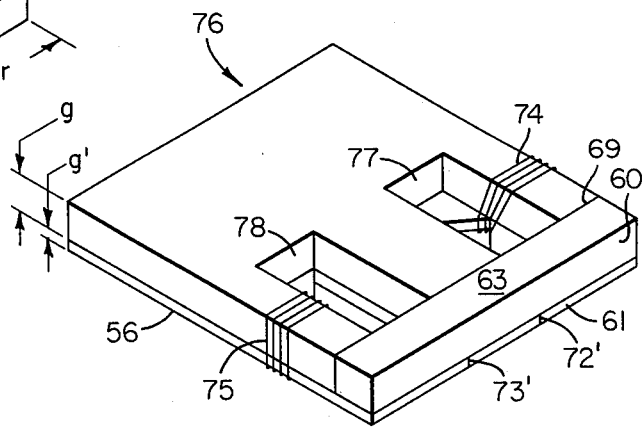
FIG_9
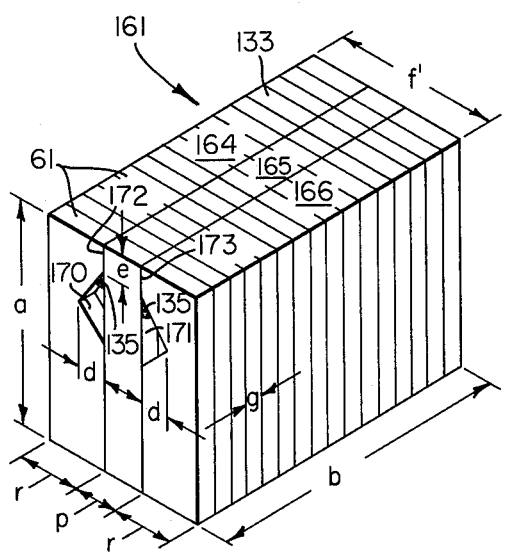
FIG_10
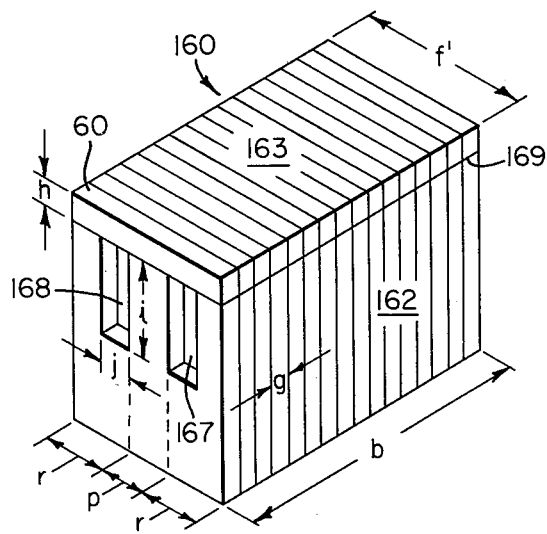
FIG_11

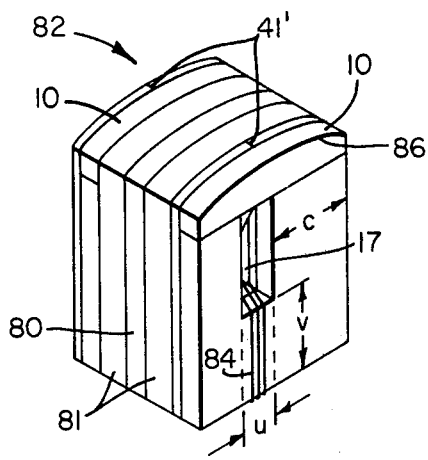
FIG_13
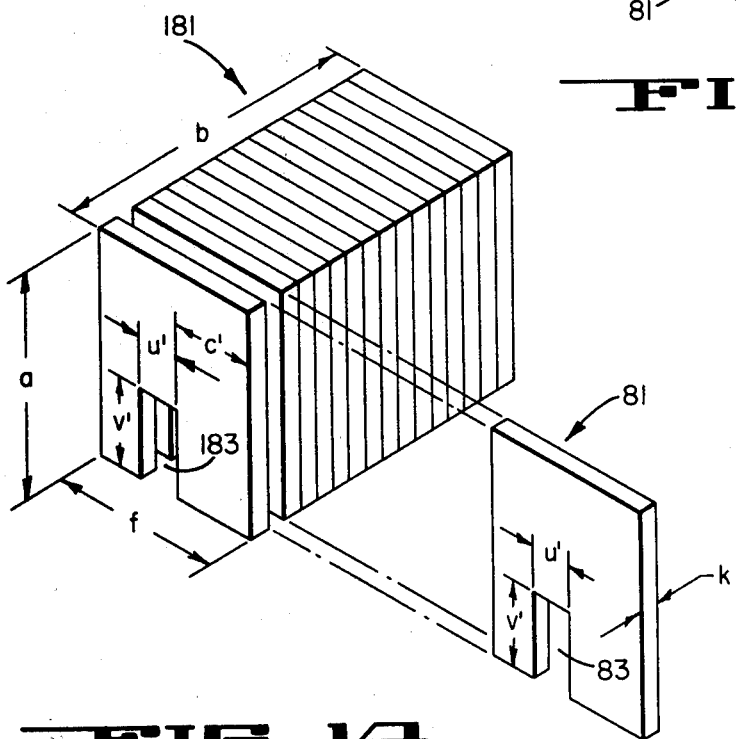
FIG_14
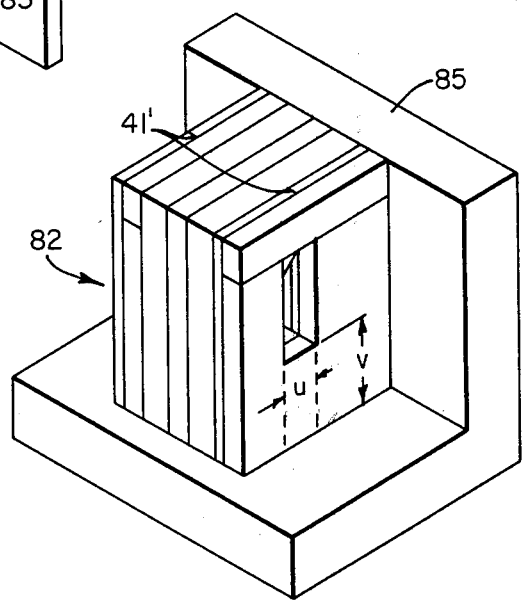
FIG_15

MAGNETIC TRANSDUCER FOR NARROW TRACK RECORDING AND PLAYBACK

BACKGROUND OF THE INVENTION

The invention relates to magnetic transducers suitable for use in connection with narrow track recording and/or reproducing and, particularly, where severe operating stresses are encountered.

Ferrite materials are widely used in magnetic recording for their preferred electrical and magnetic characteristics, as well as their resistance to wear. This latter feature is particularly advantageous in magnetic heads which are subjected to the abrasive effects of contacting magnetic recording media. However, ferrite material is not suitable for heads that are likely to encounter severe operating stresses or heads for narrow track recording applications because of its inherent brittleness. Ferrite heads encountering severe operating stresses, for example, when used in rotary head equipment where high relative speeds between the head and contacting recording medium are common, frequently chip and often structurally fail. In addition, narrow track ferrite heads chip easily during the manufacturing process.

The problem of manufacturing narrow track ferrite magnetic heads is described, e.g., in U.S. Pat. No. 3,813,693 to Gooch et al. That patent teaches forming glass pockets about the transducing gap area of the head. The pockets isolate the weak edges of the ferrite core forming the magnetic transducing gap. Thus, the gap area is protected from the forces creating the severe operating stresses and causing chipping and erosion of the ferrite material. Such heads have a rather complicated design and the method of building them is not practicable for track widths under 5 mils.

In another type of prior art narrow track ferrite head utilized in rotary scan magnetic tape recorders, the opposite side walls defining the transducing gap width are notched to the desired gap width dimension. This head has a core approximately 0.010 inches wide which is notched down to approximately 0.005 inches. However, below this dimension the structural strength of the head suffers and may fail under the stress of running against the tape at a high relative speed. In some cases, the notch causes the formation of an undesirable air bearing between the relatively moving head and tape, which results in the head undesirably flying above the tape.

Another prior art magnetic transducer is described in the U.S. Pat. No. 3,303,292 to Bedell et al. According to the teachings of that patent, a metallic (Alfesil) magnetic core is attached on one side to a nonmetallic (ferrite) magnetic body. The Alfesil core defines the nonmagnetic transducing gap of the transducer and the ferrite body provides a low reluctance path by shunting the rear portion of the Alfesil core. This transducer design is not suitable for applications where narrow track, wear resistant transducers are required. Furthermore, it does not provide the structural support and protection against gap erosion necessary for narrow track heads made of inherently brittle and porous magnetic material, which heads are intended for use in applications where high relative transducer to recording medium speeds are likely to be encountered, such as in rotary head recording equipment.

Another prior art method of batch fabrication of multitrack magnetic heads suitable for narrow track application is described in the U.S. Pat. No. 3,613,228 to Cook et al. According to this method, multiple face parts of the magnetic heads are manufactured by glass-bonding a magnetic ferrite block to a nonmagnetic block and by lapping it to a thickness corresponding to a desired track width. A multiplicity of these blocks having alternative layers of magnetic and nonmagnetic material is stacked and glass-bonded together. The stack is then cut into sections containing these alternative layers and each two sections are glass-bonded together to form a face part having a transducing gap between two adjacent ferrite layers. The face part is then glass-bonded to a back core containing coils in grooves. While this method is useful for batch fabrication of multigap, narrow track head assemblies, such as for fixed head disc files, it is not suitable for manufacturing a high quality transducer intended for operating under severe stresses, such as encountered in rotary head recording equipment, due to high relative speeds between the transducer and recording medium.

SUMMARY OF THE INVENTION

An object of this invention is to provide a magnetic transducer adapted for transduction along narrow tracks of a recording medium.

A further object of this invention is to provide a magnetic transducer manufactured from a hard, brittle magnetic material, such as ferrite, and suitable for narrow track transduction in rotary head magnetic tape recorder applications.

It is still a further object of this invention to provide a magnetic transducer having the above-indicated features and adapted for economical production.

It is still a further object of this invention to provide a magnetic transducer made of ferrite material, suitable for transduction along tracks having a width less than 5 mils.

It is still a further object of this invention to provide a method of manufacturing a magnetic transducer having the above-indicated features.

The magnetic transducer of the present invention has a magnetic core of, for example, magnetic ferrite material supported by a composite body. The magnetic core has at least one nonmagnetic gap and two opposite surfaces defining the width of that gap. The composite body also has two opposite surfaces defining its width and comprises a nonmagnetic front portion of, for example, machinable glass-ceramic and a magnetic back portion of, for example, magnetic ferrite. The magnetic core is integrally joined with the composite body, e.g., by glass-bonding one of the core's opposite surfaces to a confronting opposite surface of the composite body with the nonmagnetic front portion adjacent to and spanning the nonmagnetic gap.

In accordance with the method of the present invention, the aforedescribed magnetic transducer is manufactured by forming a magnetic core with at least two complementary magnetic poles defining a nonmagnetic gap therebetween. Two opposite surfaces are formed on the magnetic core defining the gap width. A composite body having a nonmagnetic front portion and a magnetic back portion is formed with two opposite surfaces defining its width. An opposite surface of the magnetic core and a confronting opposite surface of the composite body are joined together with the nonmagnetic front portion adjacent to and spanning the nonmagnetic gap. The width of the nonmagnetic gap is then reduced at the other, exposed opposite surface of the magnetic core, e.g., by lapping the surface, to form a desired transducing gap width.

The present invention yields a novel magnetic transducer, which may have an extremely narrow transducing gap width of 5 mils or less. The composite body provides a substantial support to the narrow magnetic core permitting hard, brittle magnetic materials, such as ferrite, to be used, thus yielding a strong wear-resistant transducer core.

BRIEF DESCRIPTION OF THE DRAWINGS

FIG. 1 illustrates a single gap, narrow track magnetic transducer embodiment according to the invention.

FIGS. 2 and 3 illustrate method steps for making magnetic cores for use in constructing the magnetic transducer of FIG. 1.

FIGS. 4 and 5 illustrate method steps for making composite bodies for use in constructing the magnetic transducer of FIG. 1.

FIG. 6 illustrates a method step of assembling the magnetic transducer shown in FIG. 1.

FIGS. 7 and 8 illustrate alternative embodiments of the magnetic transducer of the invention.

FIG. 9 illustrates a dual-gap narrow track magnetic transducer according to the invention.

FIGS. 10, 11 and 12 illustrate method steps for making the magnetic transducer shown in FIG. 9.

FIG. 13 illustrates a multitrack magnetic transducer embodiment according to the invention.

FIGS. 14 and 15 illustrate method steps for making the magnetic transducer shown in FIG. 13.

DETAILED DESCRIPTION OF THE PREFERRED EMBODIMENTS

Reference is made to FIG. 1 showing a single gap, narrow track embodiment of the magnetic transducer 10 of the present invention. The magnetic transducer 10 has a composite body 11 forming a support for a magnetic core 12. The body 11 defines a surface 23 of a size at least sufficient to support the entire confronting surface 24 of the core 12. Preferably, however, the confronting surfaces 23 and 24 are matching surfaces. The respective preferred configurations of the composite body 11 and magnetic core 12 are best shown in FIG. 6. The magnetic core 12 has two complementary rectangular magnetic poles 18, 19 abutting at confronting pole faces 20, 21 and joined together, preferably, by a bond that also forms the nonmagnetic gap 41. The magnetic pole 18 has a first groove 22 extending inwardly of the pole face 20 to permit windings of a transducing coil to be wound about one or both of the poles 18 and 19. The composite body 11 is provided with a rectangular magnetic back portion 13 and a contiguous rectangular nonmagnetic front portion 14. The two portions 13 and 14 are integrally joined together at confronting surfaces 15, 16. When the transducer 10 is assembled, the nonmagnetic front portion 14 of the composite body 11 spans the nonmagnetic gap 41 of the magnetic core 12 at the transducer face part 98 (FIG. 1), as it will be described later in more detail. In the magnetic back portion 13, a second groove 17 is formed extending inwardly of the confronting surfaces 15, 16 to permit passage of transducer coil windings.

As shown in FIG. 1, the corresponding magnetic core 12 is joined to the composite body 11 by a bonding material between the confronting planar surfaces 23, 24 of the composite body 11, and magnetic core 12, respectively. When assembled, the groove 22 of the magnetic core 12 overlaps the groove 17 of the composite body 11. The overlap is best shown in FIG. 6. Overlapped grooves 17 and 22 provide a window for passing the transducer coil windings 27 about the assembled transducer 10. The width of the assembled magnetic core 12 is designated $g'$ and, because of the construction of the composite body 11, it may be as narrow as 5 mils or less. The exact width $g'$, selected depends, of course, on the desired record track width. The width $g$ of the magnetic core 12 shown in FIG. 6 defines the width of the nonmagnetic gap 41. The width $g'$ of the assembled magnetic core 12, shown in FIG. 1 as an integral part of the transducer body 10, is substantially reduced relative to the width $g$. The reduced width $g'$ defines the desired width of the transducing gap 41' corresponding to the desired record track width.

The preferred material for the magnetic core 12 and for the magnetic back portion 13 of the composite body 11 is magnetic ferrite. A machinable glass ceramic nonmagnetic material is preferred for the front portion 14 of the composite body 11. Glass bonding material is advantageously used to join the parts of the transducer 10 made from the aforedescribed materials. It will be appreciated that by the present invention a magnetic head of a brittle and porous material, such as ferrite, can be formed having an extremely narrow width in the head-to-tape contact area and, therefore, suitable for recording on extremely narrow tracks. In addition, the construction of the magnetic head of the invention yields a rigid structure, which may easily withstand the severe stresses, such as characteristic of rotary scan recorders. These and other advantages will become more apparent from the following description of the method of making the magnetic transducer of the invention.

The preferred method of constructing a magnetic transducer in accordance with the present invention will now be described. Individual steps related to the preferred method are illustrated in FIGS. 2 through 6 of the accompanying drawings. It is to be noted that elements of individual transducers shown in the drawings are designated by reference numerals starting from 10, while corresponding elements of blocks of material from which these elements are made are designated by corresponding reference numerals starting from 100 to facilitate comparison.

Reference is now made to FIGS. 2 and 3 which show the method steps for making a plurality of individual magnetic cores 12. The complementary rectangular blocks 118, 119 of magnetic ferrite material are formed having respective confronting surfaces 120, 121 and respective top surfaces 130, 131. A first longitudinal groove 122 is ground along the surface 120 parallel and near to the top surface 130 of block 118. The groove 122 is designed to provide a window for transducer coil windings 27 of the transducer 10, as will be described later. The configuration of the groove 122 is not critical. It is, however, preferable to grind a V-shape groove whose walls form a 90° angle. The V-shape provides maximum surface strength at a transducing gap 41' of the assembled transducer 10, shown in FIG. 1 where the magnitude of the operating stress is the greatest and a gradually decreasing dimension of the core in a direction normal to the tape movement as designated by arrow 26 is necessary to provide the above-mentioned opening. The 90° angle also simplifies the grinding since this particular configuration may be formed by a single grinding operation. Alternatively, a groove similar to 122 may also be ground in block 119, when for example, a symmetrical core design is preferred.

Confronting surfaces 120 and 121 are then lapped and polished to achieve maximum flatness. Both surfaces 120, 121 are sputtered with glass, preferably Corning Glass #0120, and bonded together at a temperature approximately 690° C. Sufficient glass is sputtered onto the surfaces so that the bonded blocks 118 and 119 will have a layer 141 of glass between them of a thickness in the range of 20 to 100 microinches. Both the sputtering and bonding processes are well known in the art and, therefore, will not be described in detail. During the bonding operation, blocks 118 and 119 are held firmly together, for example, by a suitable holding fixture (not shown), with the sputtered surfaces 120, 121 superposed. The assembly of held blocks is then placed in an oven. The oven is provided with a non-oxidizing atmosphere, slowly increasing in temperature over a period of about 30 minutes to a plateau level above the softening point of the sputtered glass, in this instance to about 690° C. This temperature level is maintained for about 20 minutes and thereafter slowly (in 3 to 4 hours) decreased to about room temperature. By this bonding operation, a rigid first magnetic ferrite block 112 is formed comprising two complementary blocks 118, 119 and a thin bonding layer of glass between them shown at 141. In addition to serving as a bond, the glass layer also forms the nonmagnetic gap 41 of each of the individual ferrite cores 12, the gap length having a thickness in the range of about 20 to 100 microinches.

To strengthen the bond between the bonded blocks 118 and 119 and provide additional support for the portion of the blocks forming the nonmagnetic gap 141, a fillet 135 is formed at the rear of the nonmagnetic gap. The formation of the fillet 135 is accomplished by inserting one or more glass rods, preferably Corning Glass #7570, into that part of the first groove 122 that is adjacent to the portion of the nonmagnetic gap 141, close to the respective top surfaces 130, 131 of the ferrite block 112. The diameter of the glass rods is not critical to the method of the invention and may be, e.g., between 5 and 15 mils. The blocks with inserted glass rods are placed in an oven having a non-oxidizing atmosphere and heated for about 20 minutes at approximately 580° C. It is to be noted that this bonding temperature is substantially lower than the temperature at which the confronting surfaces 120, 121 were previously bonded. This allows the glass rod material to flow without damaging the nonmagnetic gap 141 formed between these surfaces. With the exception of the lower plateau temperature, this bonding process is conducted in the same manner as that employed to bond together blocks 118 and 119. As a result of this further bonding process, the glass rod material melts and flows to form the fillet 135 bonded to the blocks 118 and 119 at the rear of the above-mentioned portion of the nonmagnetic gap 141.

The above-disclosed various bonds employing bonding materials with various relative bonding temperatures utilized in building the magnetic transducer of the present invention may be summarized as follows: A second bond joining the magnetic back portion of the composite body to its nonmagnetic front portion and a third bond joining the confronting surfaces of the magnetic poles to form the nonmagnetic gap, respectively, employ a second bonding material having a high bonding temperature. A first bond utilizes a first bonding material to join the confronting opposite surfaces of the magnetic core and composite body at a low bonding temperature. And, finally, a fourth bond utilized to form the glass fillet in the ferrite cores employs a third bonding material at a bonding temperature which is below both aforementioned bonding temperatures.

As an example, throughout the following text, preferred dimensions of transducers manufactured in accordance with the method steps of the invention will be given. The preferred dimensions of each of the complementary blocks 118, 119 are: depth $a = 130$ mils, width $b = 300$ mils and length $c = 62$ mils. The depth of the groove 122 is approximately $d = 20$ mils. The distance between the groove 122 and surface 130 measured at surface 120 is $e = 20$ mils. Reference characters indicating these dimensions are shown in FIG. 2.

In the next method step, block 112 is sliced in the plane of the first groove 122, that is, parallel to the plane $a-c$ extending normally to confronting surfaces 120, 121, to provide a plurality of individual rectangular ferrite cores 12, each having two parallel opposite planar surfaces 24 and 37 (FIG. 3). The slicing operation may be performed by a diamond saw blade or another appropriate tool. The overall dimensions of each resulting core 12 are: length (in the direction of tape movement indicated by arrow 26) $f = 124$ mils, width $g = 13$ mils, and depth $a = 130$ mils. The individual ferrite cores 12 are then lapped at respective parallel opposite planar surfaces 24 and 37 until the saw marks resulting from the cutting are removed and a desired smooth surface finish is achieved.

The following description is made with reference to FIGS. 4 and 5, showing method steps for making individual composite bodies 11. A second rectangular block 113 of magnetic ferrite material is formed having an upper surface 115 and a second longitudinal groove 117 extending inwardly of the upper surface 115. The configuration of the groove 117 is not critical to the invention. This second groove 117 is designed to serve as a window for transducer coil windings 27 (shown in FIG. 1) when the composite body 11 and magnetic core 12 are assembled with the first and second grooves 22 and 17 overlapped as shown in FIG. 1. However, the preferable configuration of the groove 117 is rectangular, as shown in FIG. 4. It substantially simplifies the grinding operation, which in this case may be performed as a single step.

A rectangular block 114 of a nonmagnetic material is also formed having lower and upper parallel planar surface 116 and 139, respectively. Block 114 is made preferably of a wear-resistant machinable glass-ceramic material manufactured by the Corning Corporation. Aluminum oxide or nonmagnetic ferrite, which materials are highly wear-resistant and have similar coefficients of thermal expansion as the magnetic ferrite, can also be used for the nonmagnetic block 114. The lower parallel planar surface 116 corresponds in spatial area to that of upper surface 115 of the second magnetic block 113. The surfaces 115, 116 are lapped and polished and subsequently sputtered with Corning Glass #0120 glass to form a glass layer approximately 50 microninches thick. The two blocks 113 and 114 are placed together with surfaces 115 and 116 confronting and bonded together at about 690° C. in the manner previously described in connection with constructing the magnetic core 12. By the bonding process, a composite block 111 is formed as shown in FIG. 5. The cross section of the block 111 in the plane of the second groove 117, that is, in the plane $a-f$ corresponds in size to the cross section of the previously described magnetic block 112 in the plane of the first groove 122, thereof (FIGS. 3 and 5).

In the next method step, the composite block 111 is sliced in the plane of the second groove 117 to obtain a plurality of individual composite bodies 11, each having two opposite parallel planar surfaces 23, 40, as shown in FIG. 5. Each of these opposite surfaces is then lapped to remove the saw marks therefrom and to achieve a desired smooth surface finish. The preferred dimensions of the second magnetic block 113, the nonmagnetic block 114 and the composite bodies 11 formed therefrom are: depth of the composite block 111 $a=130$ mils, its width $b=300$ mils, its length $f=124$ mils, depth of the nonmagnetic block 114 $h=35$ mils, and width of the individual composite bodies $g=13$ mils (before lapping). The depth of the second groove 117 is $i=32$ mils. Depending on the particular configuration of the groove 117, as it will be described immediately below in more detail, its length is either $j=20$ mils or $j'=40$ mils. The groove 117 is positioned within the block 113 to achieve maximum overlap of groove 17 with respect to groove 22 when the composite body 11 and magnetic core 12 are joined together as shown in FIG. 1.

In the preferred embodiments of the invention shown in FIGS. 1 to 8, the groove 122 is formed only in one pole 118 of the ferrite block 112. Consequently, the groove 117 is correspondingly offset in the plane $a-f$ of the block 113 to provide an overlap as it has been disclosed above. Alternatively, groove 117 may be positioned symmetrically in the plane $a-f$ of block 113, as shown in phantom in FIG. 4. In the "offset" embodiment, the groove 122 has a preferred length of $j=20$ mils. In the "symmetrical" embodiment, the preferred length should be $j'=40$ mils if the same winding window size is desired after blocks 111 and 112 are joined. There is a significant advantage to this latter configuration of the groove 17. The individual magnetic cores 12 may be superposed with and bonded to the individual composite bodies 11 with either opposite surface 24 or 37 of core 12 confronting either opposite surface 23 or 40 of body 11 since the symmetrically arranged groove 17 overlaps the groove 22 to the same extent in all of these core/body surface arrangements.

The respective overall dimensions, $a$, $b$, and $f$ are identical for both the respective composite block 111 and magnetic block 112 of the preferred embodiment. It is to be understood, however, that this is not a necessary requirement. It is only necessary to obtain overall dimensions of the composite body 11 and magnetic core 12 which results in the nonmagnetic front portion 14 of the composite body 11 spanning the nonmagnetic gap 41 of the magnetic core 12.

Reference is now made to FIG. 6 of the attached drawings. In accordance with a subsequent method step of the invention, a composite body 11 and a magnetic core 12 cut from the respectively joined blocks 111 and 112 are assembled as follows: The respective planar surfaces 23, 24 to be joined are sputtered with glass to form a layer 25 microinches thick. It is preferable to use Corning Glass #7570 to form these layers because it has a softening temperature sufficiently lower than that used to form the gap 41 and to join the two composite body portions 13 and 14, respectively, so that such formed and joined structures are not deleteriously affected. These sputtered surfaces 23 and 24 are then superposed with the nonmagnetic front portion 14 of the composite body 11 spanning the nonmagnetic gap 41 of core 12. The body 11 and core 12 are then bonded together at approximately 580° C.

The resulting transducing core assembly is then lapped at the exposed planar surface 37 thereof to reduce the width $g$ of the ferrite core 12 until a width $g'$ defining a transducing gap width corresponding to a desired track width of a recording medium is obtained. The original width $g$ is shown in FIG. 1 in phantom. In the preferred embodiment of the invention, the core 12 has an original width $g=13$ mils that is reduced by lapping to a width of $g'=1$ mil.

After the lapping step, transducer coil windings 27 are wound around the resulting transducer body assembly 10, passing through the window formed by overlapping grooves 17 and 22 thereof. Windings may be arranged around one or both halves of the core assembly in a desired direction. However, as shown in FIG. 1, it is preferable to dispose the windings 27 close to the rear of transducing gap 41' in a direction close to parallel to the recording medium engaging face part 98 of the transducer 10 to minimize flux losses in the winding window. The transducer assembly 10 made in accordance with the method of the present invention is shown in FIG. 1 and has been previously described in connection with the description of the preferred embodiment of the invention.

It should be appreciated that, by the above-described method steps, a magnetic transducer 10 is obtained which has a simple and yet unique structure. An important feature of this magnetic transducer 10 is its extremely narrow ferrite core width in the high reluctance transducing gap area supported by a spanning nonmagnetic front portion of the composite body, which significantly strengthens the structure of the transducer. At the same time, the back portion of the ferrite core which, for ease of manufacturing, has preferably the same narrow width as the face part, is supported by a magnetic superposed back portion of the composite body, preferably made of the same ferrite material as the narrow ferrite core. In addition to strengthening the transducer 10, this superposed back portion serves as a low reluctance path for the magnetic flux.

There is an additional important feature of the transducer according to the present invention in that the nonmagnetic gap thereof is formed of a bonding material which has the highest softening temperature relative to the other bonding materials utilized in the transducer construction. Since there is a direct relationship between the softening temperature and hardness of a glass-bonding material, this latter feature further contributes to obtaining a high quality gap and extended head life.

The face part 98 of the transducer 10 shown in FIG. 1 may be contoured to any desired shape. Two alternative embodiments of the transducer according to the invention having different contours of their respective face parts 43, 43a are shown in FIGS. 7 and 8. In the embodiment of FIG. 7, the side walls 44 of face part 43 of magnetic head 10 are tapered to form an acute angle $\alpha$ with the transducing gap line 41'. This angle may be in the range between $\alpha=15°$ to 30°. Thereby, the head surface contacting the recording medium is reduced and allows a satisfactory unit pressure at a lower total force in the head-to-medium contact area. This lower force minimizes recording medium mutilation and decreases frictional effects. For magnetic tape applications, the lower friction inhibits the build-up of oxide deposits on the tape engaging portion of the transducer, which often causes undesirable tape scratches.

In the embodiment of FIG. 8, the nonmagnetic front portion 46 of the composite body is beveled at its exposed opposite surface away from the contiguous magnetic back portion 13 and towards the bonded surfaces 23, 24. The bevel reduces the overall width of the transducer face part at the head-to-medium contact surface to further lower friction. The particular angle of the bevel is designated $\beta$ in FIG. 8 and may be between 10° and 30°.

The construction of the narrow gap magnetic transducer in accordance with the present invention is not confined to single gap transducers. In some applications, such as for redundant recording of digital information or for erase-record combination heads, dual-gap heads are desired. An example of a dual-gap transducer manufactured in accordance with the method of the present invention is shown in FIGS. 9 to 12. When comparing the dual-gap transducer with the single-gap transducer embodiments previously described and shown in FIGS. 1 to 8, it is evident that these transducers have a similar design and similar method steps are employed in their construction. Therefore, to avoid undue repetition, the description of the dual-gap transducer embodiment of the invention will be limited to the aspects of its construction peculiar to such embodiment. From comparison of the drawings pertaining to the single gap and dual gap transducer embodiments follows that FIG. 9 corresponds to FIG. 1, FIG. 10 to FIG. 3, FIG. 11 to FIG. 5 and FIG. 12 to FIG. 6.

Referring now to FIG. 10, a first magnetic block 161 is formed of three complementary blocks 164, 165 and 166. The configuration of the respective blocks 164 and 166 corresponds to that of block 118 (FIG. 2), with each of the grooves 170 and 171 corresponding to groove 122. Each of the blocks 164 and 166 is manufactured in the manner of manufacturing block 118. The configuration of the block 165 corresponds to that of block 119 of FIG. 2 and block 165 is made in the same way. The blocks 164 and 166 are assembled with the respective grooves 170, 171 aligned and facing each other and with the block 165 interposed between them. The respective confronting surfaces of the blocks 164, 165 and 166, between which are formed the nonmagnetic gaps 172, 173, are first sputtered with glass and subsequently glass-bonded together in the manner described with reference to the magnetic blocks 118 and 119. The glass bond may be strengthened by forming glass fillets 135 (FIG. 10) at the rear of that portion of the nonmagnetic gaps 172 and 173 which is close to top surface 133 as previously described with reference to FIG. 3. The resulting block 161 is then sliced in the manner previously described with reference to FIG. 3 to form a plurality of individual ferrite cores 61 of width $g$.

With reference to FIG. 11, a composite block 160 is shown comprising a second magnetic block 162 and a nonmagnetic block 163. The composite block 160 is similar to block 111 of FIG. 5, differing in having two grooves 167 and 168, each corresponding to the single groove 117 of block 111. The grooves 167 and 168 are cut in the magnetic block 162 in the same manner as described with reference to block 111. Grooves 67 and 68 are formed in the magnetic body portion 62 of the composite body 60 to overlap the grooves 70 and 71 when the composite body 60 is assembled with the magnetic core 61, as shown in FIGS. 9 and 12. The respective confronting surfaces of blocks 162, 163 are sputtered with glass, glass-bonded to form a bond 169 and sliced in a manner similar to that previously described with reference to block 111 shown in FIGS. 4 and 5. The materials employed to construct the magnetic and nonmagnetic blocks, as well as the sputtering and bonding materials are the same as those used to construct the single-gap transducer embodiment of FIG. 1.

The dimensions $a$, $b$, $d$, $e$, $h$, $i$ and $j$ of the blocks 160 and 161 may be the same as corresponding dimensions of the blocks 111 and 112 employed to construct the single-gap transducer embodiment of FIG. 1. However, the preferable length of blocks 160, 161 is $f = 149$ to 174 mils, depending on the specific application of the transducer. The length of the complementary blocks 164 and 166 is preferably $r = 62$ mils and of the block 165 is preferably $p = 25$ to 50 mils, depending on the desired distance between the dual transducing gaps 72' and 73' of the assembled individual heads 76. If both transducing gaps of the dual-gap head are utilized as recording gaps, e.g., for redundant recording, then each gap may have a length between 20 to 100 microinches. If one of the gaps is to be employed as an erase gap, it may have a length of 100 to 500 microinches.

After the blocks 160 and 161 are sliced into a plurality of composite bodies 60 and dual gap magnetic cores 61, respectively, the individual transducers 76 are assembled as shown in FIGS. 9 and 12. A composite body 60 and a magnetic core 61 are glass-sputtered on confronting opposite planar surfaces 58, 59 thereof. The sputtered body 60 and core 61 are superposed with the sputtered surfaces adjoining as shown in FIGS. 9 and 12 so that the grooves 67 and 68 overlap the grooves 70 and 71 with the nonmagnetic front portion 63 of the composite body 60 spanning both nonmagnetic gaps 72, 73 of the magnetic core 61. The superposed body 60 and core 61 are then bonded. The same respective sputtering and glass-bonding processes used in the manufacture of the single-gap transducer embodiment as previously described and shown in FIG. 1 are employed to join the body 60 and core 61 of the dual-gap transducer 76.

The glass-bonded transducer assembly is then lapped at an exposed planar surface 56 of the magnetic core 61 until a desired narrow width $g'$ of the core 61 is obtained (see FIG. 9), corresponding to the desired transducing gap width. After the lapping step, separate transducing coil windings 74 and 75, insulated from each other, are wound around the transducer assembly, each winding passing through a separate one of the windows 77 and 78.

Prior to arranging the windings on the transducer 76, the face part of the transducer 76 may be contoured in the manner previously described with respect to the embodiments of FIGS. 7 and 8.

As should be apparent from the foregoing, the single-gap and dual-gap embodiments of the magnetic head of the present invention are particularly suitable for use in a rotary head recording and reproducing apparatus. In more common ones of this type of apparatus, one or more magnetic heads are precisely located with respect to a circumferential wall of a rotating drum. Each head is located at a predetermined angular position on the drum and in a plane perpendicular to the rotational axis of the drum. Reference is thereby made to U.S. Pat. No. 3,778,560. This patent describes and shows an exemplary drum assembly for magnetic recording into which a magnetic head is radially inserted into a slot provided in the drum. While the magnetic transducer of the present invention has particular advantages suited to the high stresses encountered in rotary scan recorders, its use is not confined to such apparatus. It is also useful in other types of recorders, such as magnetic disc recorders and longitudinal recorders of single track or multitrack configuration.

Another embodiment of the present invention is manufactured by superposing two or more individual magnetic transducers 10 shown in FIG. 1 to form a longitudinal multitrack head stack such as shown at 82 in FIG. 13. In this embodiment, a magnetic shield 80 is interposed between nonmagnetic spacers 81 in a conventional manner to prevent cross talk between adjacent channels of the individual heads of the stack 82. The configuration of the individual shields 80 is rectangular. The dimensions $a$ and $f$ of the shields 80 are the same as corresponding dimensions of the flanking transducers 10. The width of the individual shields 80 ordinarily is in the order of the corresponding dimensions of the spaced transducers 10 or larger and is selected in accordance with the particular requirements of the multitrack head stack 82, especially, permissible cross talk. Generally, shield width will be in the range from 10 mils to 50 mils. The preferred configuration of the nonmagnetic spacer 81 utilized in the particular embodiment of the longitudinal multitrack head stack 82 is shown in FIG. 14. The nonmagnetic spacer 81 has a length $f$ and a depth $a$ corresponding to the equivalent dimensions of the transducer 10. The width, $k$, of the individual spacers 81 is on the order of the corresponding dimension of the spaced transducers 10 and is selected along with the width dimension of the individual shields 80 according to the desired guard band between adjacent tracks. For example, in this particular multitrack head stack 82, the individual spacers 81 have a width $k=15$ mils. There is a groove 83 formed in the spacer 81, to provide sufficient space for passage of the windings 84 of a transducer coil when the head stack 82 is assembled. In this embodiment of the present invention, the transducer coil winding 84 is wound around the back core of the transducer 10 in a direction substantially parallel with the transducing gap line 41. The reason for this arrangement is to simplify the configuration of the nonmagnetic shield 81, which, in this case has a rectangular groove 83 to accommodate the windings 84 when the multitrack longitudinal head stack 82 is assembled as shown in FIG. 13. The overall dimensions $u'$ and $v'$ of the groove 83 in the spacer 81 (FIG. 14) is slightly larger than the corresponding dimensions $u$ and $v$ of the space required by the windings 84 to provide a convenient accommodation for the winding 84, in the assembly 82. Alternatively, the transducing coil winding could be placed closer to the transducing gap, such as windings 27 are in the embodiment of FIG. 1. However, in this latter case, the nonmagnetic spacer is conveniently made of more than one part (not shown) and, thus, a more complicated multitrack transducer configuration results.

The preferred method of manufacturing the multitrack longitudinal head stack embodiment of the invention will be described now. A block 181 of nonmagnetic machinable glass-ceramic material shown in FIG. 14 is prepared, having overall dimensions $a$, $b$ and $f$ corresponding to those of the magnetic ferrite block 112 shown in FIG. 3. Then, a groove 183, preferably of a rectangular shape, is ground in the block 181 in the manner previously described and shown in FIG. 4, with respect to forming groove 117 of the ferrite block 113. The preferable respective groove defining dimensions of each transducer and spacer 81 are as follows: $c=62$ mils; $c'=60$ mils; $v=65$ mils; $v'=69$ mils; $u=20$ mils; and $u'=24$ mils. The nonmagnetic block 181 is then cut along parallel planes to provide a plurality of rectangular individual nonmagnetic spacers 81 as shown in FIG. 14.

The individual magnetic shields 80 are cut from a third magnetic block (not shown) of wear-resistant material such as ferrite. It should be noted that while the respective materials of the magnetic shields and nonmagnetic spacers are not critical to the construction of the multichannel head of the present invention, it is preferable that these materials have a high wear-resistance to minimize the abrasive effects of the contacting recording medium.

The individual parts of the head stack are then assembled on a mounting fixture, such as fixture 85 of FIG. 15, to prevent non-zero gap scatter and misalignment of the tracks of the multitrack head stack 82. In case the parts forming the stack 82 are to be glass-bonded together, the confronting planar surfaces of the individual parts 10, 80 and 81 are sputtered preferably with low temperature glass (about 450° C.) prior to the bonding process. The parts are then assembled as shown in FIG. 15, in the following sequence: a first transducer 10, a first nonmagnetic spacer 81, a magnetic shield 80, a second nonmagnetic spacer 81, and a second transducer 10. If more than two heads are to be stacked to form the longitudinal head stack 82, then the assembly would continue with a third nonmagnetic spacer 81, second magnetic shield 80, etc., until the desired number of individual transducers 10 is assembled in the stack 82. All the transducing gaps 41' of the stack are aligned along the face part of the stack. The nonmagnetic spacers are positioned in the stack in such a way that the groove 83 provided therein accommodates the transducing winding 84, as it has been disclosed above.

The assembled parts are then held firmly together and submitted to the glass-bonding process at approximately 450° C. The bonding temperature has to be substantially lower than the lowest bonding temperature previously employed in constructing the head 10 in order not to damage or weaken the previous bonds.

When glass-bonding is employed to secure the parts together, the transducer coil windings 84 are wound on the transducer cores 10 after the bonding step has been accomplished, in order to avoid exposing the windings to excessive heat. After the assembled parts are bonded, the transducer coil windings 84 are wound around the individual transducers 10, each passing through an individual window, as shown at 17 in FIG. 13.

Instead of the glass-bonding process, the transducer head assembly 82 may first be provided with the windings and then placed in a mold (not shown) and potted with epoxy. This alternative step is simpler and, therefore, more economical than the glass-bonding process. However, it is suitable only in applications where high operational temperatures are not to be encountered.

The recording medium engaging surface of the resulting multitrack head stack 82 may be contoured to any desired radius, such as shown at 86 in FIG. 13, employing well-known contouring techniques.

While preferred embodiments of the invention have been described above and illustrated in the drawings, it will be appreciated that a number of alternatives and modifications may be made which will fall within the scope of the appended claims.

I claim:

1. A magnetic transducer suitable for recording and reproduction on narrow tracks of a magnetic medium, comprising:
   (a) a magnetic core having at least two confronting poles defining at least one transducing gap therebetween, and having a width defining a recording track width, said magnetic core having a first planar surface extending over both side poles and said gap;
   (b) a supporting composite body comprising a nonmagnetic front portion and a contiguous magnetic back portion and having a first planar surface extending over both said nonmagnetic front portion and said magnetic back portion;
   (c) a first bond integrally joining said magnetic core at said first planar surface thereof to said first planar surface of said composite body with said nonmagnetic front portion of said composite body adjacent to and spanning said transducing gap of said magnetic core, said magnetic core, composite body and bond thus forming an integral transducer body; and
   (d) said integrally joined magnetic core having a second exposed planar surface substantially parallel with its first planar surface, said first and second planar surfaces defining a selected narrow track width of a substantially smaller dimension relative to the width of said magnetic core prior to joining to said composite body.

2. The magnetic transducer of claim 1, wherein:
   (a) said magnetic core comprises at least one pair of complementary magnetic poles abutting at confronting pole faces with a layer of nonmagnetic material therebetween defining said transducing gap, at least one of said magnetic poles having a first groove extending inwardly of said confronting face thereof;
   (b) said nonmagnetic front portion and said contiguous magnetic back portion of said composite body having respective confronting surfaces integrally joined together, said magnetic back portion having at least one second groove extending inwardly from said confronting surface thereof; and
   (c) said integrally joined magnetic core and composite body having said first and second grooves overlapping to define a window adapted to receive transducer coil windings.

3. The magnetic transducer of claim 2 wherein said first groove has a V-shaped cross section with walls forming a 90° angle.

4. The magnetic transducer of claim 2 wherein said second groove has a rectangular cross section.

5. The magnetic transducer of claim 2 further comprising at least one transducer coil winding passing through said window and about both said magnetic core and composite body.

6. The magnetic transducer of claim 1 wherein the width of said magnetic core is smaller than the width of said composite body integrally joined therewith.

7. The magnetic transducer of claim 1 wherein said nonmagnetic front portion of said composite body and a portion of said magnetic core adjacent to that portion have contoured side walls each forming an acute angle with the plane of said transducing gap.

8. The magnetic transducer of claim 7 wherein said nonmagnetic front portion of said composite body has a beveled exposed opposite surface extending away from said contiguous magnetic back portion towards said integrally joined magnetic core.

9. The magnetic transducer of claim 1 wherein said nonmagnetic front portion of said composite body has a beveled exposed opposite surface extending away from said contiguous magnetic back portion towards said integrally joined magnetic core.

10. The magnetic transducer of claim 1 wherein said magnetic core and said magnetic back portion of said composite body is made of magnetic ferrite.

11. The magnetic transducer of claim 1 wherein said nonmagnetic front portion of said composite body is made of machinable glass-ceramic.

12. The magnetic transducer of claim 1 wherein said nonmagnetic front portion of said composite body is made of aluminum oxide.

13. The magnetic transducer of claim 1 wherein said nonmagnetic front portion of said composite body is made of nonmagnetic ferrite.

14. The magnetic transducer of claim 1 wherein said first bond joining respective first planar surfaces of said magnetic core and said composite body is a glass-bond and wherein said bonded magnetic core is lapped to a selected width to thereby define a desired transducing gap width.

15. The magnetic transducer of claim 2 comprising a second bond integrally joining said nonmagnetic front portion to said magnetic back portion of said composite body, and a third bond integrally joining said complementary magnetic poles to form said nonmagnetic gap, said second and third bonds comprising a second bonding material, and wherein said first bond comprises a first bonding material, said second bonding material having a higher bonding temperature than said first bonding material.

16. The magnetic transducer of claim 15 wherein said first and second bonding material are different types of glass.

17. The magnetic transducer of claim 1, for use with a multitrack recording and/or reproducing apparatus, comprising:
   (a) at least a second magnetic transducer having a magnetic core, composite body and a first bond forming a second integral transducer body, identical with said first integral transducer body, said magnetic transducer mounted spaced apart with their respective transducing gaps aligned in parallel planes;
   (b) a magnetic shield inserted between said magnetic transducers; and
   (c) means securing said magnetic transducers and magnetic shield together to form a multitrack rigid magnetic transducer assembly.

18. The magnetic transducer of claim 17 comprising a nonmagnetic spacer inserted between each magnetic transducer and adjacent magnetic shield to space the transducers from each other a selected distance.

19. A magnetic transducer suitable for use with a narrow track recording and/or reproducing apparatus comprising:
   (a) a magnetic core having two confronting magnetic poles and a nonmagnetic filling material therebetween defining a transducing gap, said magnetic core having a first and a second opposite parallel planar surfaces defining a width of said gap corresponding to a recording track width, said magnetic core defining a first aperture;

(b) a composite body comprising a nonmagnetic front portion and a contiguous magnetic back portion, said composite body having a first and a second opposite parallel planar surfaces each extending over said respective front and back portions, said opposite surfaces corresponding in size to the opposite planar surfaces of said magnetic core, said composite body defining a second aperture;

(c) a bond joining said magnetic core at said first planar surface thereof to a superposed said first planar surface of said composite body to form an integral body, with said nonmagnetic front portion of said composite body spanning said transducing gap of said magnetic core and with said first and second apertures overlapping to accommodate transducer coil windings; and wherein (d) said second parallel planar surface of said integrally joined magnetic core is exposed and defines with its first parallel planar surface a selected narrow transducing gap width substantially smaller relative to the width of said transducing gap prior to joining said magnetic core to said composite body.

20. The magnetic transducer of claim 1 wherein said magnetic core has a width less than 5 mils.

* * * * *